(12) United States Patent
Li (10) Patent No.: US 6,553,156 B1
(45) Date of Patent: Apr. 22, 2003

(54) OPTICAL ISOLATORS WITH ULTRA-LOW POLARIZATION MODE DISPERSION

(75) Inventor: Wei-Zhong Li, San Jose, CA (US)

(73) Assignee: Oplink Communications, Inc., San Jose, CA (US)

( * ) Notice: Subject to any disclaimer, the term of this patent is extended or adjusted under 35 U.S.C. 154(b) by 257 days.

(21) Appl. No.: 09/608,484

(22) Filed: Jun. 30, 2000

(51) Int. Cl.[7] .................................................. G02B 6/00
(52) U.S. Cl. .......................... 385/11; 359/494; 359/496; 359/497; 359/501; 359/499
(58) Field of Search ...................... 385/11, 36; 359/494, 359/496, 497, 499, 501

(56) References Cited

U.S. PATENT DOCUMENTS

| | | | | |
|---|---|---|---|---|
| 4,566,761 A | * | 1/1986 | Carlsen | ...................... 359/495 |
| 5,557,692 A | | 9/1996 | Pan et al. | ...................... 385/11 |
| 5,579,420 A | * | 11/1996 | Fukushima | ................... 385/11 |
| 5,602,673 A | | 2/1997 | Swan | ......................... 359/281 |
| 5,631,771 A | * | 5/1997 | Swan | .......................... 359/484 |
| 5,727,109 A | * | 3/1998 | Pan | .............................. 385/11 |
| 6,301,045 B1 | * | 10/2001 | Liu | ............................. 359/484 |

* cited by examiner

*Primary Examiner*—Audrey Chang
*Assistant Examiner*—Leo Boutsikaris
(74) *Attorney, Agent, or Firm*—Lumen Intellectual Property Services, Inc.

(57) ABSTRACT

This invention presents a novel tunable module that can be incorporated in various optical devices, to provide a tunability and selectivity in a characteristic of an optical signal by effectively modifying its optical path lengths. The present invention also provides an optical isolator that incorporates such a tunable module, so that polarization mode dispersion is minimized to an arbitrarily low level. The present invention further describes methods for incorporating the tunable module in optical devices and for tuning the optical characteristics.

71 Claims, 4 Drawing Sheets

OPTICAL ISOLATORS WITH ULTRA-LOW POLARIZATION MODE DISPERSION

FIELD OF THE INVENTION

This invention relates generally to optical devices for fiber-optic systems. More particularly, it relates to a new type of optical isolators with arbitrarily low polarization mode dispersion.

BACKGROUND ART

Fiber-optic networks are emerging as the backbone of modern communications systems. An important building block in a fiber-optic network is an optical isolator. This is a non-reciprocal device that permits light signals to travel in one direction and blocks light signals propagating the opposite direction. Optical isolators are generally employed in fiber-optic networks near the output ports of laser diodes which provide light signal sources in optical fibers. Because laser diodes are particularly sensitive to signal reflections, which cause the wavelength of the diode output signal to drift and adversely affect the power of the output signal, optical isolators are implemented to block such reflections and to help "lock" the output of the laser diodes.

The optical isolators in the prior art typically comprise a plurality of birefrigent crystals or polarizers, one or more Faraday rotators, and a pair of microlenses such as gradient-index (GRIN) lenses to couple the optical signal from one fiber to another. The principles of their operation are as follows. In a forward direction, a first birefrigent polarizer splits an input light signal into ordinary and extraordinary rays. After passing through a 45° Faraday rotator, the ordinary and extraordinary rays enter a second birefrigent polarizer, whose optical axis is at 45° relative to the optical axis of the first polarizer. Thus, the ordinary and extraordinary rays propagate through the second polarizer as ordinary and extraordinary rays, respectively. The net result is that after traveling from the first polarizer through the second polarizer, the two rays become parallel, but are displaced from each other. An output GRIN lens then focuses them at a point on the end of an output fiber. In the backward direction from the second polarizer to the first polarizer, the second polarizer splits an incoming light into ordinary and extraordinary rays. Upon passing through the 45° Faraday rotator, the polarizations of the light in two rays are rotated 45° in the same direction. This rotation is non-reciprocal with the rotation of light in the forward direction, so that the ordinary ray from the second polarizer becomes the extraordinary ray in the first polarizer and the extraordinary ray from the second polarizer becomes the ordinary ray in the first polarizer. That is, the ordinary and extraordinary rays have exchanged places. Because of this exchange, the light does not leave the first polarizer in parallel rays. This non-parallel light is then focused by an input GRIN lens at points that are not located at the end of the input fiber. Hence the light traveling in the backward direction is not passed back into the input fiber, that is, it is effectively "blocked".

Though the optical isolator as described above has achieved the effect of blocking backreflected and other light traveling in the backward direction, it also inadvertently produces an undesirable effect. Because a birefrigent crystal has two different indices of refraction, ordinary and extraordinary rays traversing through the optical isolator often travel two different optical path lengths. Thus, even though the signal is recombined later by the output GRIN lens, the signal may have one mode of polarization ahead of, or behind, the other. Consequently, there is a time delay between the two polarization modes and the signal becomes dispersed. This time delay is known in the art as Polarization Mode Dispersion (PMD). As the signal travels through an optical fiber over a long distance, the dispersion effect worsens. Moreover, the presence of numerous optical isolators employed in a fiber-optic network further compounds the problem.

Figure 1:
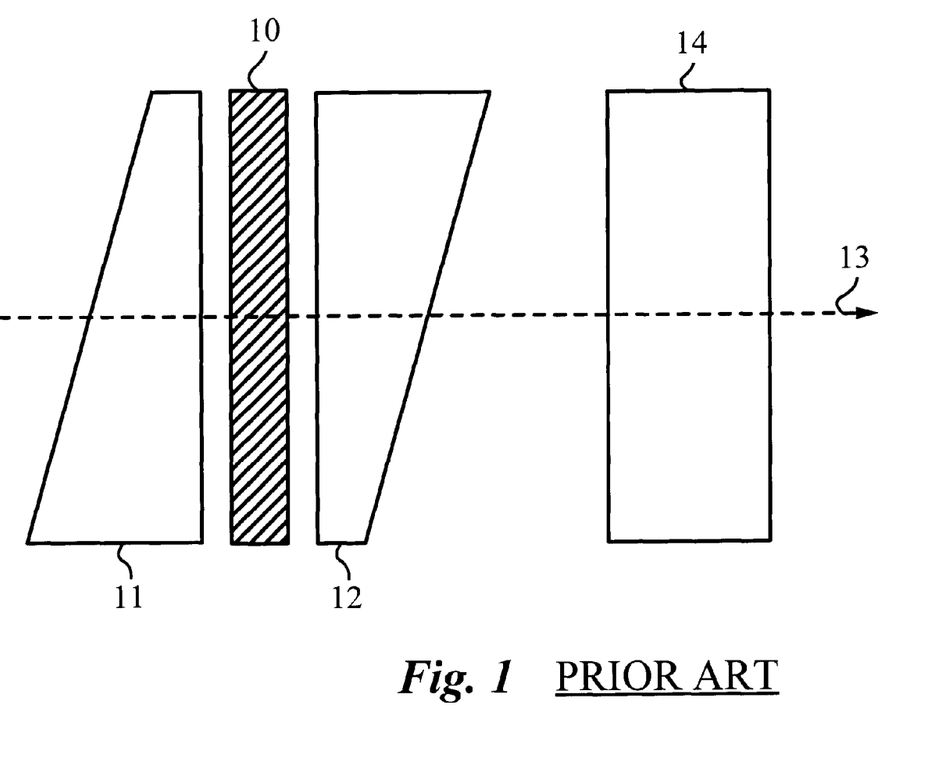
FIG. 1 shows an optical isolator according to the prior art.

A great deal of ingenuity has been applied in the art to minimize PMD in optical isolators. The most common practice in combating PMD thus far has been to insert a compensation plate of birefrigent material in the optical isolator as described above, as shown in FIG. 1. A Faraday rotator 10 is disposed between a first polarizer 11 and a second polarizer 12 along an illustrative optical path 13. The first polarizer 11 and the second polarizer 12 are arranged such that any light traveling from the second polarizer 12 to the first polarizer 11 will be effectively blocked, as explained above. A compensation plate 14, which may be inserted on either side of the Faraday isolator 10 in the optical path 13, is disposed to the right of the second polarizer 12 as a way of illustration. The compensation plate 14 is arranged to have its fast axis, the axis of the birefrigent material having smaller index of refraction, perpendicular to the fast axis of the polarizer on the same side of the rotator, i.e., the second polarizer 12 in this case. Moreover, its thickness and indices of refraction are so chosen to equalize the difference in optical path lengths traveled by ordinary and extraordinary rays of the optical signal through the optical isolator, thereby reducing PMD.

In order to achieve a perfect compensation in the optical isolator, however, the thickness of the compensation plate must be exact with little tolerance. This requires high-precision manufacturing of birefrigent crystals, which is costly and time consuming. As fiber-optic systems rapidly grow in communications networks; there is an urgent need for optical isolators with ever-lower PMD that can be produced easily and inexpensively.

OBJECTS AND ADVANTAGES

Accordingly it is a principal object of the present invention to provide a novel tunable module that can be employed in various optical devices. It is another object of the present invention to incorporate such a tunable module in an optical isolator, such that PMD can be optimized in a controlled manner. It is a further object of the present invention to provide methods for incorporating the tunable module in optical devices and for modifying the characteristics of optical signals. It is an additional object of the present invention to provide methods for making optical isolators with arbitrarily low PMD.

The primary advantage of the present invention is that it provides optical devices with an active feedback mechanism, such that PMD, or other optical characteristics, can be optimized in a controlled manner. More specifically, by incorporating a tunable module in an optical isolator, PMD can be reduced to an arbitrarily low-level without having to precisely manufacture birefrigent crystals in the isolator. Further advantages of the present invention are evident in the simple and novel design of the tunable module and the ease with incorporating it in optical devices.

These and other objects and advantages will become apparent from the following description and accompanying drawings.

SUMMARY OF THE INVENTION

This invention provides a novel tunable module for optical devices; and the methods for incorporating it in optical devices, particularly in optical isolators, to optimize PMD and other optical characteristics.

The tunable module of the present invention comprises one or more optical elements that are movable relative to each other, such that the optical path lengths of an optical signal traversing through the module can be varied.

The change in the optical path lengths can be achieved by employing optical elements that have uniform indices of refraction, but are tapered in thickness along the path of the optical signal; or by using optical elements that are uniform in thickness along the path of the optical signal, but bearing a gradient of indices of refraction in a direction perpendicular to the path of the optical signal; or a combination of both.

The present invention provides an optical isolator incorporating the tunable module described above. The optical isolator comprises a first birefrigent polarizer, a Faraday rotator, a second birefrigent polarizer, and a tunable module disposed along the path of an optical signal. The two birefrigent polarizers are arranged on opposite sides of the Faraday rotator, such that any light traversing from the second polarizer to the first polarizer will not be passed back into the input fiber, i.e., effectively blocked. The tunable module can be disposed on either side of the Faraday rotator. The tunable module further comprises one or more birefrigent elements.

PMD of the optical signal is reduced by arranging the fast optical axis of the tunable module to be perpendicular to the fast optical axis of the polarizer on the same side of the Faraday rotator. In the present invention, PMD is further minimized by adopting an active feedback mechanism. This involves adjusting the positions of the movable elements in the tunable module so to vary the optical path lengths of the optical signal, while monitoring the PMD of the optical signal, until the PMD is minimized. The positions of the movable elements are then secured by means of an adhesive agent, such as an epoxy, or other suitable coupling. In the optical isolator thus constructed, the optical path lengths of light rays in different polarization modes are optimally equalized.

In the above optical isolator the tunable module and polarizers can be formed from various birefrigent materials, such as calcite, lithium niobate, rutile, and $YVO_4$ based crystals. They are typically made from the same type of birefrigent material for the ease of manufacturing, though they can also comprise different birefrigent materials.

The tunable module of the present invention can be incorporated in other optical devices in a manner similar to that is describe above, to provide a tunability and selectivity in a characteristic of an optical signal.

The present invention further provides an optical isolator comprising a Faraday rotator, first and second birefrigent polarizers arranged on opposite sides of the Faraday rotator, and a birefrigent compensation plate disposed along the path of an optical signal. The two birefrigent polarizers are arranged such that any light traversing from the second polarizer to the first polarizer will be blocked. Moreover, at least one of the birefrigent polarizers is a movable polarizer with respect to the other such that the optical path lengths of the optical signal traversing through the movable polarizer can be varied. The compensation plate can be disposed on either side of the Faraday rotator.

The compensation plate and the polarizers can be formed from various birefrigent materials, such as calcite, lithium niobate, rutile, and $YVO_4$ based crystals. They are typically made from the same type of birefrigent material for the ease of manufacturing, though they can also comprise different birefrigent materials.

PMD is reduced by arranging the fast optical axis of the compensation plate to be perpendicular to the fast optical axis of the polarizer on the same side of the Faraday rotator. PMD is further minimized by employing an active feedback mechanism. This involves adjusting the positions of the movable polarizer so to vary the path lengths of the optical signal, while monitoring the PMD of the optical signal, until the PMD is minimized. The position of the movable polarizer may then be secured by means of an adhesive agent, such as an epoxy, or other suitable coupling. In the optical isolator thus constructed, the optical path lengths of light rays in different polarization modes are optimally equalized.

The novel features of this invention will be best understood from the following drawings and detailed description.

DETAILED DESCRIPTION

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Figure 2:
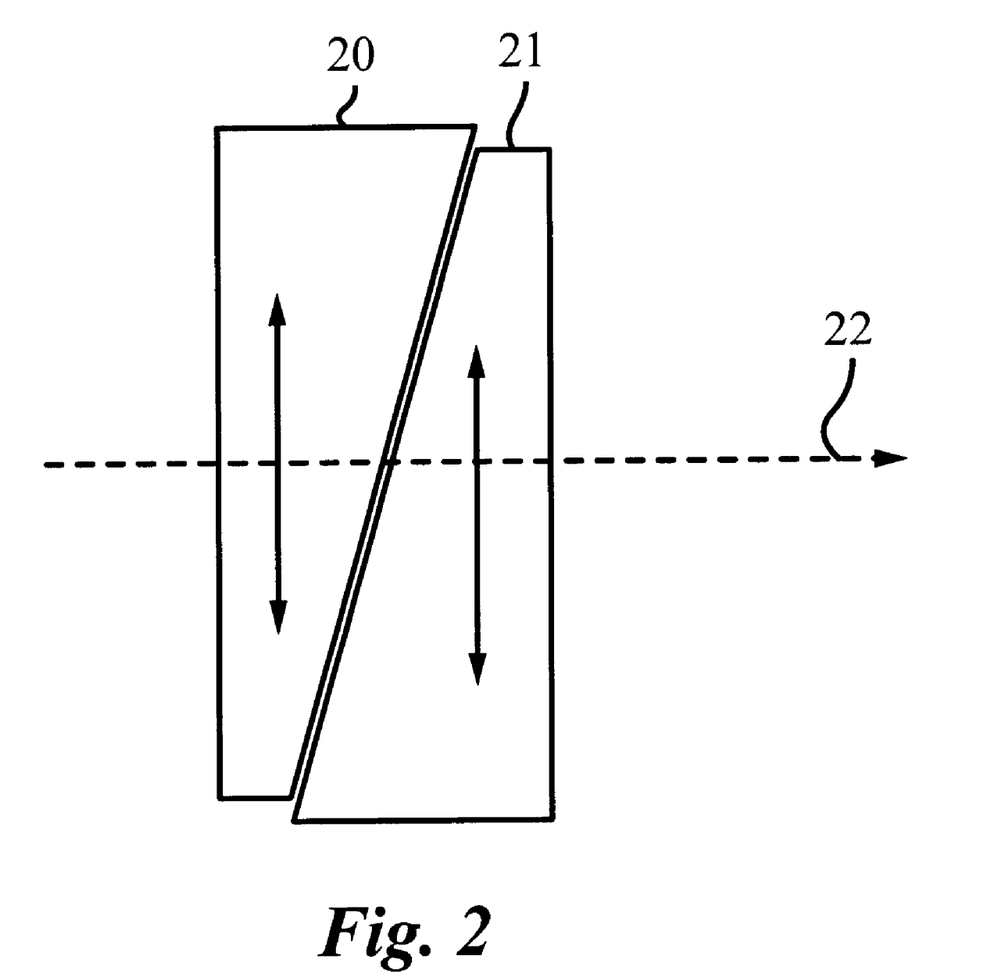
FIG. 2 illustrates an exemplary embodiment of a tunable module according to the present invention.

FIG. 2 depicts an exemplary embodiment of a tunable module according to the present invention. It comprises a tapered element 20 adjacent to another tapered element 21, disposed along an illustrative optical path 22. The element 20 and the element 21 are movable relative to each other, such that the optical path lengths of an optical signal through the module can be varied.

It is to be understood that the term "illustrative optical path" used in this specification is construed to provide a reference line to illustrate the physical arrangement among various optical elements in an optical system of the present invention, and to provide a forward direction along which an optical signal would travel in the optical system of interest.

The tapered elements 20 and 21 in FIG. 2 may comprise birefrigent materials, such as calcite, rutile, lithium niobate, or $YVO_4$ based crystals. They are generally formed from the same birefrigent material, for the ease of manufacturing.

Alternatively, the tunable module may comprise optical elements that have uniform thickness and are adjacent along the path of the optical signal. At least one of the elements is configured to have a gradient of indices of refraction in a direction perpendicular to the path of the optical signal. Thus, as the elements move perpendicularly to the direction of the optical signal, the optical path lengths of the optical signal through the module are effectively modified. This can be achieved, for instance, by having an optical element comprising a stack of birefrigent slabs with varying indices of refraction along a direction perpendicular to the path of the optical signal.

In some applications, the tunable module may comprise a single optical element that is either uniform in composition but tapered in thickness; or is uniform in thickness but bearing a gradient of indices of refraction along a direction perpendicular to the path of an optical signal. The element is movable such that the optical path lengths of the optical signal through the element can be varied. Such an optical element can be formed from a birefrigent material, such as calcite, rutile, lithium niobate, or a YVO$_4$ based crystal; or comprises a stacked plurality of birefrigent slabs with varying indices of refraction along the direction perpendicular to the path of the optical signal.

Figure 3:
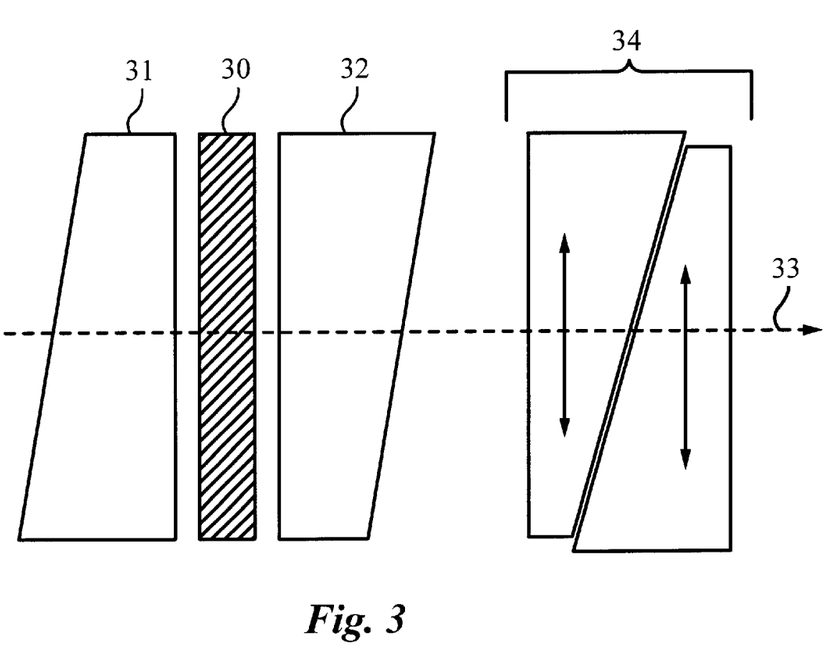
FIG. 3 depicts an exemplary embodiment of an optical isolator according to the present invention.

FIG. 3 depicts an exemplary embodiment of an optical isolator incorporating a tunable module of the present invention. A Faraday rotator 30 is disposed between a first polarizer 31 and a second polarizer 32 along an illustrative optical path 33. The first polarizer 31 and the second polarizer 32 are arranged such that any light traversing from the second polarizer 32 to first polarizer 31 will be effectively blocked. A tunable module 34 is disposed in the optical path 33, to the right of the second polarizer 32. By way of example, the tunable module 34 comprises two optical elements that are movable relative to the other, similar to the arrangement shown in FIG. 2, such that the optical path lengths of an optical signal through the module can be varied.

It should be understood that when describing the operation of an optical isolator in, this specification, the term "blocked" means that the arrangement among the constituent polarizers and Faraday rotator is such that any light traversing in the backward direction from the second polarizer to the first polarizer will not be passed back to the input fiber, that is, it is effectively blocked.

To reduce PMD, a fast optical axis of the tunable module 34 is arranged to be perpendicular to a fast optical axis of the second polarizer 32. To further minimize PMD, an active feedback mechanism is employed. It entails tuning the positions of the movable element or elements of the tunable module, while monitoring the PMD of an optical signal using a suitable detection means, until the PMD is minimized. In the optical isolator thus constructed, the optical path lengths of light rays in different polarization modes are optimally equalized.

After the PMD is optimized, the movable element or elements of the tunable module are typically secured by means of an adhesive agent, or other suitable coupling. The adhesive agent can be a UV epoxy, or a high temperature epoxy. For example, a common practice involves first using a UV epoxy to keep the elements of the tunable module in their approximate positions; after the PMD is tuned to a minimal level, the UV epoxy is then hardened by exposure to a UV light.

In FIG. 3, the Faraday rotator 30 is typically a 45° Faraday rotator, and the first polarizer 31 and the second polarizer 32 are wedge-shaped polarizers formed from the same birefrigent material. They are arranged such that the optical axis of the second polarizer 32 is oriented at 45° relative to the optical axis of the first polarizer 31, such that any light traversing from the second polarizer 32 to first polarizer 31 will be effectively blocked. The tunable module comprises a birefrigent material whose fast axis is oriented perpendicularly to the fast axis of the second polarizer, such that a light ray that has moved along a path with a smaller index of refraction (therefore faster) in the two polarizers travels along a path with a larger index of refraction (hence slower) in the tunable module, and that a light ray that has traversed along a path with a larger index of refraction (therefore slower) in the two polarizers moves along a path with a smaller index of refraction (thus faster) in the tunable module.

The tunable module is typically formed from the same birefrigent material as the birefrigent polarizers, such as calcite, lithium niobate, rutile, or a YVO$_4$ based crystal. In such a case, the optical axis, whether it is fast or not, of the tunable module is arranged perpendicularly to the optical axis of the polarizer on the same side of the rotator. Alternatively, the tunable module may be formed from a material having relative magnitudes of the indices of refraction opposite to that of the birefrigent crystal of the first and second polarizers. For example, the polarizers may be formed from lithium niobate which has its index of refraction for the ordinary ray $n_o$ greater than that for the extraordinary ray $n_e$ (i.e., $n_o > n_e$); and the tunable module is formed from rutile which has its index of refraction for the ordinary ray $n_o$ less than that for the extraordinary ray $n_e$ (i.e., $n_o < n_e$). In such a scenario, the optical axis of the tunable module is arranged to be parallel to the optical axis of the polarizer on the same side of the rotator. Note that the module's fast axis is still perpendicular to the fast axis of the polarizer.

Figure 4:
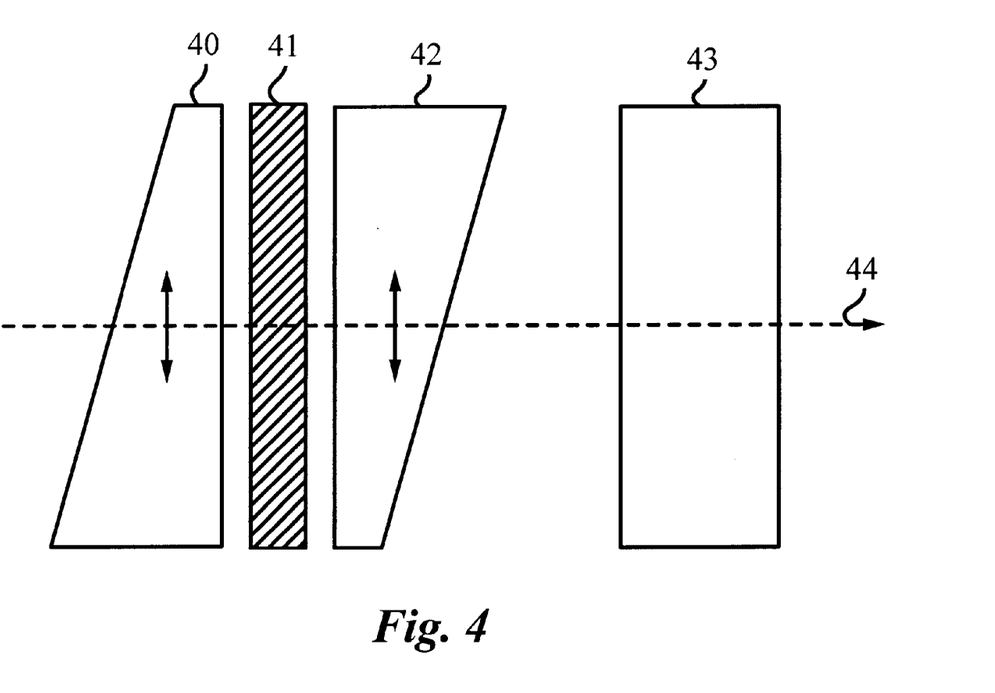
FIG. 4 shows an alternative embodiment of an optical isolator according to the present invention.

FIG. 4 shows an alternative embodiment of an optical isolator according to the present invention. A first tapered polarizer 40, a Faraday rotator 41, a second tapered polarizer 42, and a compensation plate 43 are disposed along an illustrative optical path 44. The first polarizer 40 and second polarizer 42, disposed on opposite sides of the Faraday rotator 41, are arranged such that any light traversing from the second polarizer 42 to the first polarizer 40 will be effectively blocked. Moreover, at least one of the two polarizers is a movable polarizer with respect to the other such that the optical path lengths of an optical signal through the movable polarizer can be varied. Whereas the compensation plate 43 is uniform in both thickness and composition.

To reduce PMD, a fast optical axis of the compensation plate 43 is arranged to be perpendicular to a fast optical axis of the second polarizer 42. To further minimize PMD, an active feedback mechanism is employed. It involves tuning the positions of the movable polarizer or polarizers, while monitoring the PMD of an optical signal using a suitable detection means, until the PMD is minimized. In the optical isolator thus constructed, the optical path lengths of light rays in different polarization modes are optimally equalized.

After the PMD is optimized, the movable polarizer or polarizers are usually secured by means of an adhesive agent, or other suitable coupling. The adhesive agent can be a UV epoxy, or a high temperature epoxy.

In the above embodiment, the compensation plate 43 is disposed to the right of the second polarizer 42, as a way of illustration. In practice, it can be disposed anywhere along the optical path 44. For instance, it can be inserted between the first polarizer 40 and the Faraday rotator 41; between the Faraday rotator 41 and the second polarizer 42, or positioned to the left of the first polarizer 40. In all these arrangements, the fast optical axis of the compensation plate 43 is always perpendicular to the fast optical axis of the polarizer on the same side of the Faraday rotator 41. And all these arrangements can effectively reduce PMD.

In FIG. 4, the Faraday rotator 41 is typically a 45° Faraday rotator, and the first polarizer 40 and the second polarizer 42 are wedge-shaped or tapered polarizers formed from the same birefrigent material. They are arranged such that the optical axis of the second polarizer 42 is oriented at 45° relative to the optical axis of the first polarizer 40, such that any light traversing from the second polarizer 42 to the first polarizer 40 will be effectively blocked. The compensation plate typically comprises a birefrigent material. Its fast axis is oriented perpendicularly to the fast axis of the second polarizer 42, such that a light ray that has moved along a path with a smaller index of refraction (therefore faster) in the two polarizers travels along a path with a larger index of refraction (hence slower) in the compensation plate, and that a light ray that has traversed along a path with a larger index of refraction (therefore slower) in the two polarizers moves along a path with a smaller index of refraction (thus faster) in the compensation plate. For the sake of simplicity and the ease of manufacturing, the compensation generally comprises the same birefrigent material as the birefrigent polarizers, such as calcite, lithium niobate, rutile, or a $YVO_4$ based crystal. However, the compensation plate can also be made of a different birefrigent material.

It should be noted that the exemplary embodiments of the optical isolator depicted in FIGS. 3 and 4 are for illustration purpose only. The principle of the present invention can be used to construct many alternative embodiments of the optical isolator that are functionally equivalent to these exemplary embodiments.

It is also apparent to those skilled in the art that the tunable module of the present invention can be incorporated in a variety of optical devices, including but not limited to optical isolators, to provide a tunability and selectivity in a characteristic of an optical signal by effectively tempering its optical path lengths, as demonstrated by the above exemplary embodiments.

Although the present invention and its advantages have been described in detail, it should be understood that various changes, substitutions, and alternations can be made herein without departing from the principle and the scope of the invention. Accordingly, the scope of the present invention should be determined by the following claims and their legal equivalents.

What is claimed is:

1. A tunable module incorporated in an optical apparatus, the optical apparatus comprising a Faraday rotator disposed between a first polarizer and a second polarizer along an optical path, wherein said first polarizer and said second polarizer are arranged such that any light traveling from said second polarizer to said first polarizer will be effectively blocked, said tunable module comprising:
   at least two optical elements, wherein at least one of said optical elements is a movable element such that an optical path length of an optical signal traversing through said tunable module can be varied.

2. The tunable module of claim 1 wherein said at least two optical elements comprise birefrigent materials.

3. The tunable module of claim 2 wherein said birefrigent materials include calcite, rutile, lithium niobate, and $YVO_4$ based crystals.

4. The tunable module of claim 1 wherein said at least two optical elements are adjacent to each other.

5. The tunable module of claim 1 wherein said movable element is tapered.

6. The tunable module of claim 1 wherein said movable element is configured to have a gradient of index of refraction along a direction substantially perpendicular to the path of said optical signal.

7. The tunable module of claim 6 wherein said movable element comprises a stack of birefrigent materials with varying indices of refraction along a direction substantially perpendicular to the path of said optical signal.

8. An optical apparatus with arbitrarily low polarization mode dispersion, the optical apparatus comprising:
   one or more optical devices; and
   a tunable module in optical communication with said one or more optical devices, said tunable module comprising at least two optical elements, wherein at least one of said optical elements is a movable element such that an optical path length of an optical signal traversing through said module can be varied.

9. The optical apparatus of claim 8 wherein said one or more optical devices comprise an optical isolator.

10. The optical apparatus of claim 8 wherein said one or more optical devices comprise an optical circulator.

11. The optical apparatus of claim 8 where said one or more optical elements comprise birefrigent materials.

12. The optical apparatus of claim 11 wherein said birefrigent materials include calcite, rutile, lithium niobate, and $YVO_4$ based crystals.

13. The optical apparatus of claim 8 wherein said at least two optical elements are adjacent to each other.

14. The optical apparatus of claim 8 wherein said movable element is tapered.

15. The optical apparatus of claim 8 wherein said movable element is configured to have a gradient of index of refraction along a direction substantially perpendicular to the path of said optical signal.

16. The optical apparatus of claim 15 wherein said movable element comprises a stack of birefrigent materials with varying indices of refraction along a direction perpendicular to the path of said optical signal.

17. An optical apparatus for optical fibers comprising:
   a Faraday rotator disposed between a first polarizer and a second polarizer along an optical path, wherein said first polarizer and said second polarizer are arranged such that any light traveling from said second polarizer to said first polarizer will be effectively blocked; and
   a tunable module disposed in said optical path on either side of said Faraday rotator, comprising at least two optical elements, wherein at least one of said optical elements is a movable element such that an optical path length of an optical signal traversing through said module can be varied.

18. The optical apparatus of claim 17 wherein said first polarizer comprises a birefrigent material selected from the group consisting of calcite, rutile, lithium niobate, and $YVO_4$ based crystals.

19. The optical apparatus of claim 17 wherein said second polarizer comprises a birefrigent material selected from the group consisting of calcite, rutile, lithium niobate, and $YVO_4$ based crystals.

20. The optical apparatus of claim 17 wherein said one or more optical elements comprise one or more birefrigent materials selected from the group consisting of calcite, rutile, lithium niobate, and $YVO_4$ based crystals.

21. The optical apparatus of claim 17 wherein said first polarizer, said second polarizer, and said tunable module are formed from the same birefrigent material selected from the group consisting of calcite, rutile, lithium niobate, and $YVO_4$ based crystals.

22. The optical apparatus of claim 17 wherein said at least two optical elements are adjacent to each other.

23. The optical apparatus of claim 17 wherein said movable element is tapered.

24. The optical apparatus of claim 17 wherein said movable element is configured to have a gradient of index of refraction along a direction substantially perpendicular to the path of said optical signal.

25. The optical apparatus of claim 24 wherein said movable element comprises a stack of birefrigent materials with varying indices of refraction along a direction substantially perpendicular to the path of said optical signal.

26. The optical apparatus of claim 17 wherein said tunable module is disposed on the right side of said Faraday rotator.

27. The optical apparatus of claim 17 wherein said tunable module is disposed on the left side of said Faraday rotator.

28. The optical apparatus of claim 17 wherein said second polarizer is disposed between said Faraday rotator and said tunable module.

29. The optical apparatus of claim 17 wherein said first polarizer is disposed between said tunable module and said Faraday rotator.

30. The optical apparatus of claim 17 wherein said Faraday rotator is a 45° Faraday rotator, and wherein said first polarizer and said second polarizer are birefrigent polarizers, arranged such that an optical axis of said second polarizer is oriented at 45° relative to an optical axis of said first polarizer.

31. The optical apparatus of claim 17 is further disposed between a first optical transmission assembly and a second optical transmission assembly.

32. The optical apparatus of claim 31 wherein said first optical transmission assembly comprises an optical fiber and a GRIN lens.

33. The optical apparatus of claim 31 wherein said second optical transmission assembly comprises an optical fiber and a GRIN lens.

34. An optical apparatus for optical fibers comprising:
   a) a Faraday rotator disposed between a first polarizer and a second polarizer along an optical path, wherein said first polarizer and said second polarizer are arranged such that any light traveling from said second polarizer to said first polarizer will be effectively blocked, and wherein at least one of said polarizers is a movable polarizer such that an optical path length of an optical signal traversing through said movable polarizer can be varied; and
   b) a compensation plate disposed in said optical path on either side of said Faraday rotator.

35. The optical apparatus of claim 34 wherein said first polarizer comprises a birefrigent material selected from the group consisting of calcite, rutile, lithium niobate, and $YVO_4$ based crystals.

36. The optical apparatus of claim 34 wherein said first polarizer is tapered.

37. The optical apparatus of claim 34 wherein said second polarizer comprises a birefrigent material selected from the group consisting of calcite, rutile, lithium niobate, and $YVO_4$ based crystals.

38. The optical apparatus of claim 34 wherein said second polarizer is tapered.

39. The optical apparatus of claim 34 wherein said compensation plate comprises a birefrigent material selected from the group consisting of calcite, rutile, lithium niobate, and $YVO_4$ based crystals.

40. The optical apparatus of claim 34 wherein said first polarizer, said second polarizer, and said compensation plate are formed from the same birefrigent material selected from the group consisting of calcite, rutile, lithium niobate, and $YVO_4$ based crystals.

41. The optical apparatus of claim 34 wherein said compensation plate has a predetermined thickness along the path of said optical signal.

42. A method for tuning an optical apparatus, comprising:
   a) disposing an optical device in the path of an optical signal;
   b) disposing a tunable module comprising at least two optical elements in the path of said optical signal, wherein at least one of said optical elements is a movable element such that an optical path length of said optical signal traversing through said module can be varied; and
   c) adjusting the position of said movable element so to vary said optical path length of said optical signal, while monitoring a characteristic of said optical signal using a detection means, until said characteristic falls within a predetermined range, wherein said characteristic of said optical signal is polarization mode dispersion.

43. The method of claim 42 wherein said optical device is an optical isolator.

44. The method of claim 42 wherein said optical device is an optical circulator.

45. The method of claim 42 wherein said one or more optical elements comprise birefrigent materials.

46. The method of claim 45 wherein said birefrigent materials include calcite, rutile, lithium niobate, and $YVO_4$ based crystals.

47. The method of claim 42 wherein said at least two optical elements are adjacent to each other.

48. The method of claim 42 wherein said movable element is tapered.

49. The method of claim 42 wherein said movable element is configured to have a gradient of index of refraction along a direction substantially perpendicular to the path of said optical signal.

50. The method of claim 49 wherein said movable element comprises a stack of birefrigent materials with varying indices of refraction direction along a direction substantially perpendicular to the path of said optical signal.

51. The method of claim 42 further comprising securing the position of said movable element, after said characteristic of said optical signal is tuned to be within said predetermined range.

52. The method of claim 51 wherein said movable element is secured by means of an adhesive agent.

53. The method of claim 52 wherein said adhesive agent is a UV epoxy.

54. The method of claim 52 wherein said adhesive agent is a high temperature epoxy.

55. A method for making an optical apparatus, comprising:
   a) disposing a Faraday rotator between a first birefrigent polarizer and a second birefrigent polarizer along an optical path, wherein said first polarizer and said second polarizer are arranged such that any light traveling from said second polarizer to said first polarizer will be effectively blocked;
   b) disposing a tunable module comprising at least two optical elements of birefrigent material on either side of said Faraday rotator in said optical path, wherein at least one of said optical elements is a movable element such that optical path lengths of an optical signal traversing through said module can be varied;
   c) arranging a fast axis of said tunable module to be perpendicular to a fast axis of the polarizer on the same side of said Faraday rotator; and
   d) adjusting the position of said movable element to vary the optical path lengths of said optical signal, while monitoring the polarization mode dispersion of said optical signal using a detection means, until the polarization mode dispersion is minimized.

56. The method of claim 55 wherein said second polarizer is disposed between said Faraday rotator and said tunable module.

57. The method of claim 55 wherein said tunable module is disposed on the right side of said Faraday rotator.

58. The method of claim 55 wherein said tunable module is disposed on the left side of said Faraday rotator.

59. The method of claim 55 wherein said first polarizer is disposed between said tunable module and said Faraday rotator.

60. The method of claim 55 wherein said Faraday rotator is a 45° Faraday rotator, and wherein an optical axis of said second polarizer is oriented at 45° relative to an optical axis of said first polarizer.

61. The method of claim 55 wherein said first polarizer, said second polarizer, and said tunable module comprise birefrigent materials.

62. The method of claim 61 wherein said birefrigent materials include calcite, rutile, lithium niobate, and $YVO_4$ based crystals.

63. The method of claim 55 wherein said first polarizer, said second polarizer, and said tunable module are formed from the same birefrigent material selected from the group consisting of calcite, rutile, lithium niobate, and $YVO_4$ based crystals.

64. The method of claim 55 wherein said at least two optical elements are adjacent to each other.

65. The method of claim 55 wherein said movable element is tapered.

66. The method of claim 55 wherein said movable element is configured to have a gradient of indices of refraction along a direction substantially perpendicular to the path of said optical signal.

67. The method of claim 66 wherein said movable element comprises a stack of birefrigent materials with varying indices of refraction along the direction substantially perpendicular to the path of said optical signal.

68. The method of claim 55 further comprising the step of securing the position of said movable element, after the polarization mode dispersion is minimized.

69. The method of claim 68 wherein said movable element is secured by means of an adhesive agent.

70. The method of claim 69 wherein said adhesive agent is a high temperature epoxy.

71. The method of claim 70 wherein said adhesive agent is a UV epoxy.

* * * * *